United States Patent [19]

Totsu

[11] Patent Number: 5,186,084
[45] Date of Patent: Feb. 16, 1993

[54] AUTOMATIC SCREW DRIVER AND A METHOD FOR CONTROLLING THE SAME

[76] Inventor: Katsuyuki Totsu, 1-17-8 Higashi-Mukojima, Sumida-ku, Tokyo, Japan

[21] Appl. No.: 570,592

[22] Filed: Aug. 21, 1990

[30] Foreign Application Priority Data

Aug. 25, 1989 [JP] Japan ............................ 1-217222

[51] Int. Cl.$^5$ ............................................. B25B 23/06
[52] U.S. Cl. ........................................ 81/431; 81/433; 81/57.37
[58] Field of Search ................... 81/57.37, 431, 433; 227/117-119

[56] References Cited

U.S. PATENT DOCUMENTS

| | | | |
|---|---|---|---|
| 1,839,490 | 1/1932 | Moeller | 81/433 |
| 3,583,451 | 6/1971 | Beluidere | 81/433 |
| 3,642,039 | 2/1972 | McGee | 81/57.37 |
| 3,656,520 | 4/1972 | Caffa | 81/433 |
| 4,246,939 | 1/1981 | Boegel | 81/431 |
| 4,495,841 | 1/1985 | Mori et al. | 81/51.37 |

Primary Examiner—J. J. Swann
Attorney, Agent, or Firm—Young & Thompson

[57] ABSTRACT

An automatic screw driver and a method for controlling the same, characterized by a fluid chamber in which a suction force is developed so as to retain stably a screw at a predetermined position irrespective of kind of material for the screw preparatory to a screwing operation of the driver, and a control circuit including a plurality of timers in order to perform a sequential operation consisting of steps of supplying the screw at the tip end of a bit, perpendicularly retaining the screw there and entering a standby state for the screwing operation, and actuating a driver when the sequential operation is completed, so that the screwing operation is facilitated and stabilized, resulting in a considerable improvement in the efficiency thereof.

4 Claims, 6 Drawing Sheets

AUTOMATIC SCREW DRIVER AND A METHOD FOR CONTROLLING THE SAME

FIELD OF THE INVENTION

This invention relates to an automatic screw driver with a screw supplying mechanism for delivering a screw to the distal end portion of the motor-driven screw driver, and a method for controlling the same.

BACKGROUND OF THE INVENTION

Japanese Patent Publication No. 59-37196 has disclosed an automatic screw driver with a screw supplying mechanism comprising a motor-driven screw driver body, a rotating bit an end portion of which is magnetized, a suction guide which surrounds the rotating bit and extends in the axial direction of the bit, a catcher body surrounding an end portion of the suction guide, an outer shell fixed on the upper portion of the catcher body, an inner shell which is fixed on the driver body and engageable with the outer shell, a first chamber and a second chamber formed inside the outer shell in response to a sliding movement of a piston portion which is slidably fitted in the inner shell so as to contact the inner surface of the outer shell, a mechanism for supplying alternatively fluid to the first and second chambers, a screw supplying mechanism communicated with an aperture which is formed at a distal end of the catcher body. The suction guide is slidably mounted in the inner shell in the axial direction of the bit. Further, when a pressure is applied in either the first chamber or the second chamber, the outer shell is moved toward the driver body relative to the inner shell and the suction guide.

The conventional driver with the screw supplying mechanism as disclosed in the publication is constituted such that a magnetic screw to be supplied to the tip end of the rotating bit is sucked by cooperation of air suction force and magnetic force of the screw and screwed into a tapped hole. In such a case, the screws to be supplied to the catcher body which surrounds the tip end of the rotating bit, namely the distal end of the suction guide, are automatically delivered one by one by air pressure supplied through an air pipe. When the screw is delivered to the catcher body, a switch of the motor-driven screw driver is turned on and the rotating bit starts to rotate. At the same time, the outer shell is moved toward the driver body by air pressure relative to the inner shell and the suction guide which are secured on the driver body. To this end, the screw is sucked and retained at the tip end of the rotating bit by cooperation of the air suction force and the magnetic force. The outer shell is further moved toward the driver body relative to the inner shell and the suction guide so that the tip end portion of the rotating bit projects by a sufficient length from a lower-cylindrical portion of the suction guide while the screw retained at the tip end of the rotating bit is allowed to rotate. Then, the screw is retained at the tip end of the rotating bit only by the magnetic force. Therefore, the screwing operation of the driver is performed in such a state.

As understood from the above description, the conventional driver with the screw supplying mechanism is regarded as advantageous from a point of view that the mechanism having a relatively simple structure serves for supplying the screws one by one preparatory to an automatic screwing operation.

However, if a screw made of non-magnetic material such as aluminum, brass, plastics, ceramics and the like is supplied, the screw is not sucked or retained at the tip end portion of the rotating bit in such a state that the tip end portion thereof projects by a sufficient length from the lower-cylindrical portion of the suction guide upon the screwing operation of the driver. To this end, the screwing operation is not performed. Thus, there has been a disadvantage that the screw made of the non-magnetic material is never usable for the conventional driver with the screw supplying mechanism. Further, even though the screw made of magnetic material is supplied, the screw is unstably retained at the tip end of the continuously rotating bit only by the magnetic force, resulting in causing looseness and falling-off thereof from the bit end.

SUMMARY OF THE INVENTION

Accordingly, it is an object of the present invention to provide an automatic screw driver having the following features and a method of controlling the same. Namely, the automatic screw driver and the method of controlling the same are characterized by a fluid chamber in which a suction force is developed so as to supply and retain stably a screw irrespective of kind of material for the screw, preparatory to a screwing operation, and a control circuit including a plurality of timers in order to perform a sequential operation consisting of steps of supplying the screw, retaining correctly the screw at the tip end of a bit and entering a stanby state for the screwing operation, and actuating a driver when the sequential operation is completed, so that the screwing operation is facilitated and stabilized, resulting in a considerable improvement in the efficiency thereof.

In order to realize the object, according to the invention, there is provided an automatic screw driver including, a bit which is detachably mounted on the end portion of a rotating output shaft extending from a motor-driven screw driver body, a suction guide which is mounted on the distal end of the rotating output shaft so as to be elastically movable in the axial direction of the output shaft, surrounds the bit and projects by a sufficient length to receive a screw head, from a tip end of the bit, a screw supplying- and supporting-unit which is movably mounted on the driver body and surrounds the suction guide so that a screw is delivered to the distal end of the unit and retained there temporarily while moving toward and away from the bit and the suction guide in the axial direction of the output shaft, first and second fluid chambers which are formed between the screw supplying- and supporting-unit having inner and outer shells and an outer case of the driver body having inner and outer fixed shells, so that the screw is delivered to the tip end of the bit and retained there due to a suction force developed by alternatively supplying fluid to the first and second fluid chambers, and a third fluid chamber which is formed between the outer surface of the suction guide and the inner surface of the inner shell of the screw supplying- and supporting-unit and communicated with an inner space of the suction guide, so that a vacuum suction force is developed therein, resulting in sucking and retaining the screw at the distal end of the unit perparatory to starting a screwing operation of the driver. Further, the automatic screw driver has a control circuit which is formed so as to perform in a predetermined timing a sequential operation consisting of steps of advancing the screw supplying- and supporting-unit toward the tip end of the bit in the axial direction of the output shaft such that the tip end of the bit is retreated within the unit, supplying the screw to the unit, retreating the unit from the tip end of the bit in the axial direction of the output shaft, rotating the bit, and sucking and retaining the screw at the distal end of the unit preparatory to starting a screwing operation of the driver.

In addition, according to the invention, there is provided the automatic screw driver including the screw supplying- and supporting-unit with the following components. Namely, a pair of openable claws is mounted opposite to each other on the distal end portion of the unit so as to guide and temporarily retain the screw which is delivered through the suction guide. An oscillating claw is mounted on the distal end portion of the unit so as to guide through a suction guide passage defined by the claws and correctly place the screw at the distal end portion of the unit. A screw supplying pipe is provided in the vicinity of the end portion of the unit so as to deliver into a screw guiding passage the screw which is supplied from the outside of the driver body. Also, the unit is provided with a first ventilating pipe communicating with the first fluid chamber, a second ventilating pipe communicating with the second fluid chamber, and a third ventilating pipe communicating with the third fluid chamber. Further, the aforementioned oscillating claw serves for shutting the suction guide passage defined by the claws and for guiding and correctly placing the screw which is supplied through the screw guiding passage, at the distal end portion of the unit where the screwing operation is performed. The oscillating claw moves outward so as to open the suction guide passage due to a pressure exerted thereon by a retreating movement of the unit. Furthermore, the oscillating claw is provided with a locking member. When the screw is supplied into the unit, the locking member locks a releasing movement of the openable claws by elastic engagement with the claws and relieves the engagement by the retreating movement of the unit. On the other hand, according to the invention, there is provided a method of controlling the aforementioned automatic screw driver. The method includes a step of predetermining a period required for entering a standby state for starting an advancing movement of the screw supplying- and supporting-unit toward the tip end of the bit after generating an operation signal, a period required for advancing the unit toward the tip end of the bit, a period required for supplying the screw to the unit, a period required for retreating the unit from the tip end of said bit, and a period required for rotating the bit. Additionally, the control system includes another step of performing in a predetermined timing, a sequential operation consisting of steps of advancing the screw supplying- and supporting-unit toward the tip end of the bit in the axial direction of the output shaft, supplying the screw to the unit, retreating the unit from the tip end of the bit in the axial direction of the output shaft, rotating the bit, and sucking and retaining the screw at the distal end of the unit preparatory to starting a screwing operation of the driver. In order to perform the sequential operation, the control system includes a plurality of timers which serve to predetermine the respective periods and are allowed to start sequentially one after another. Further, in the control system, when the screw is sucked and retained at the tip end of the bit, the bit is allowed to rotate for a predetermined period such that the tip end portion of the bit is engaged with the screw head.

In the automatic screw driver according to the present invention, the bit is detachably mounted on the distal end of the rotating output shaft extending from the motor-driven screw driver body. The suction guide, which is mounted on the end portion of the rotating output shaft so as to be elastically movable in the axial direction of the output shaft, surrounds the bit and projects from the tip end of the bit. The screw supplying- and supporting-unit is mounted on the driver body and surrounds the suction guide so that the screw is delivered the distal end of the unit and retained there temporarily while moving toward and away from the end portions of the bit and the suction guide in the axial direction of the output shaft. Further, the first and second fluid chambers are formed between the screw supplying- and supporting-unit having the inner and outer shells and an outer case of the driver body having the inner and outer fixed shells. To this end, the screw is delivered to the tip end of the bit and retained there due to a suction force developed by alternatively supplying fluid to the first and second fluid chambers. In addition, the control circuit is prepared in order to perform the following sequential operation in a predetermined timing. Namely, the sequential operation consists of steps of advancing the screw supplying- and supporting-unit toward the tip end of the bit in the axial direction of the output shaft such that the tip end of the bit is retreated within the unit, supplying the screw to the unit, retreating the unit from the tip end of the bit in the axial direction of the output shaft, rotating the bit, and sucking and retaining the screw at the distal end of the unit preparatory to starting a screwing operation of the driver.

Particularly, in the automatic screw driver according to the invention, the third chamber is formed between the outer surface of the suction guide and the inner surface of the inner shell of the screw supplying- and supporting-unit and communicated with the inner space of the suction guide. To this end, the screw is sucked and retained at the distal end of the unit by a vacuum suction force developed inside the suction guide irrespective of kind of material for the screw.

Further, by utilizing a plurality of timers, the control system for the automatic screw driver according to the invention predetermines readily the period required for entering a standby state for starting the advancing movement of the screw supplying- and supporting-unit toward the tip end of the bit after generating the operation signal, the period required for advancing the unit toward the tip end of the bit, the period required for supplying the screw to the unit, the period required for retreating the unit from the tip end of the bit, and the period required for rotating the bit. Consequently, the sequential operation consisting of these steps at the respective periods is performed by starting the timers sequentially one after another.

BRIEF DESCRIPTION OF THE DRAWINGS

The invention will be further described in the following detailed description with reference to the accompanying drawings which illustrate perferred embodiments by way of example and in which:

FIGS. 1 to 3 depict a motor-driven screw driver with a screw supplying mechanism as one embodiment of an automatic screw driver according to the invention, in which:

FIGS. 5(1)-(6) are timing chart diagrams showing one embodiment of an operation of the control circuit shown in FIG. 4.

PREFERRED EMBODIMENTS OF THE INVENTION

Figure 1:
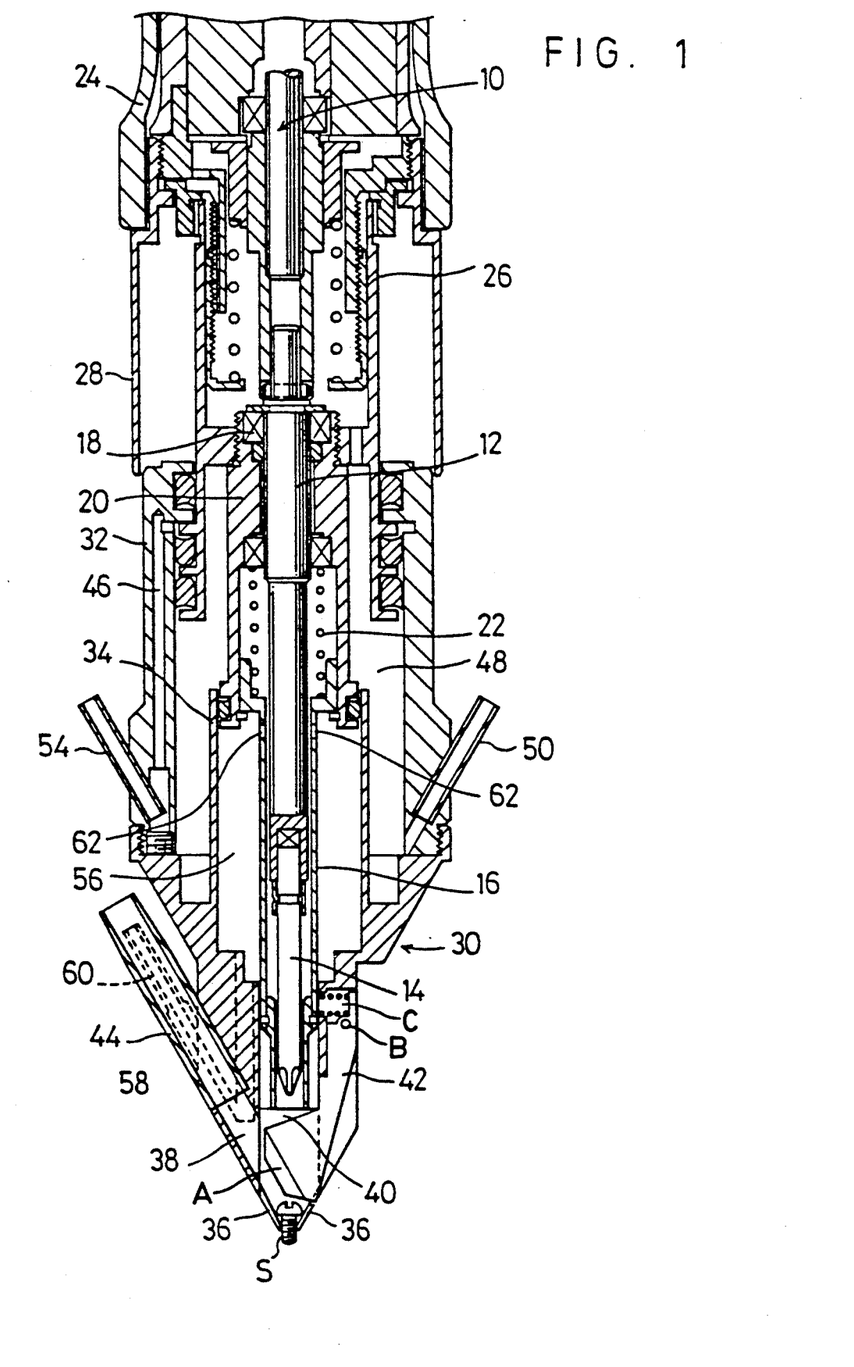
FIGS. 1 and 2 are cross-sectional views of an essential part of the motor-driven screw driver which is in operating state.
Figure 2:
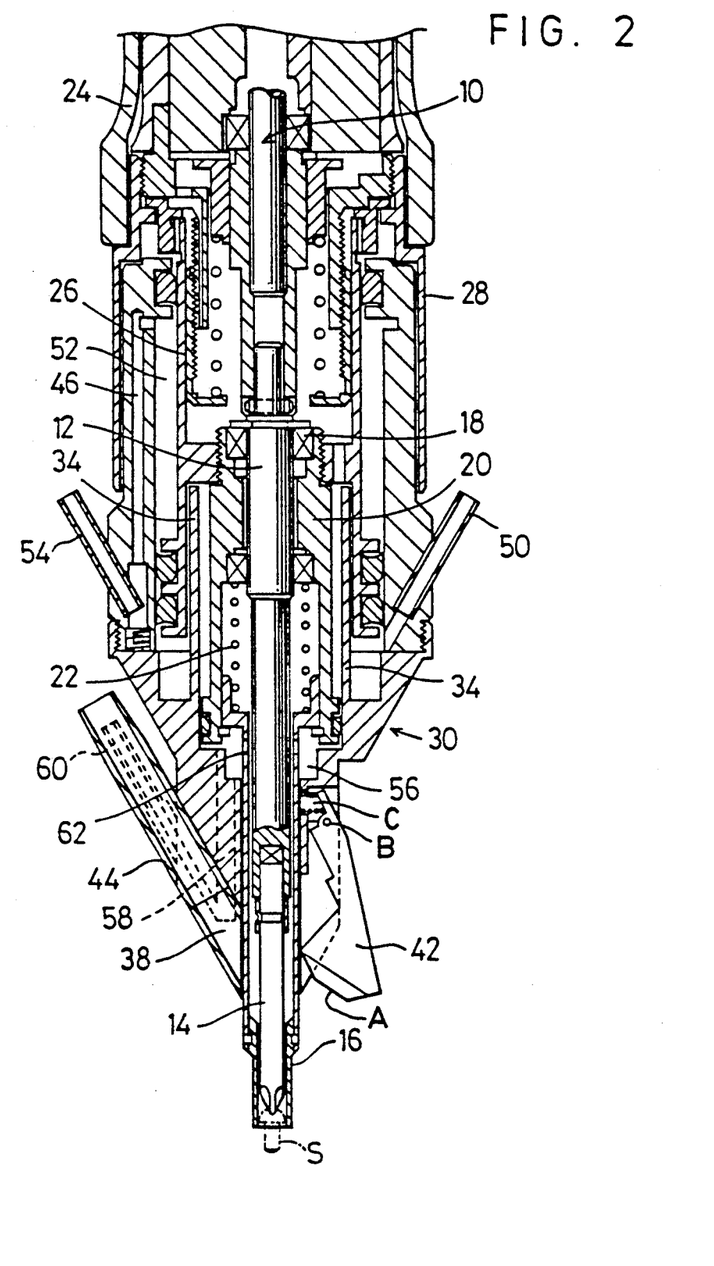

Referring to FIGS. 1 and 2, the motor-driven screw driver body 10 includes a rotating output shaft 12 extending from the driven motor (not shown). The output shaft 12 is supported within the bearing housing 20 by a bearing 18. A bit 14 usable as a driver tool is detachably mounted at the end of the rotating output shaft 12. The bit 14 is surrounded by a cylindrical suction guide 16, one end of which extends into a bearing housing 20 and abuts against an inside face thereof. The cylindrical suction guide 16 is biased outwardly by a spring 22 so as to be elastically movable in the axial direction of the shaft 12. The bearing housing 20 is threadingly engaged with and supported by a fixed inner shell 26 which is held within an outer case 24 of the motor-driven screw driver body 10. Further, a fixed outer shell 28 is supported, at one end thereof, by the outer case 24 so as to be arranged outside the fixed inner shell 26.

Figure 3:
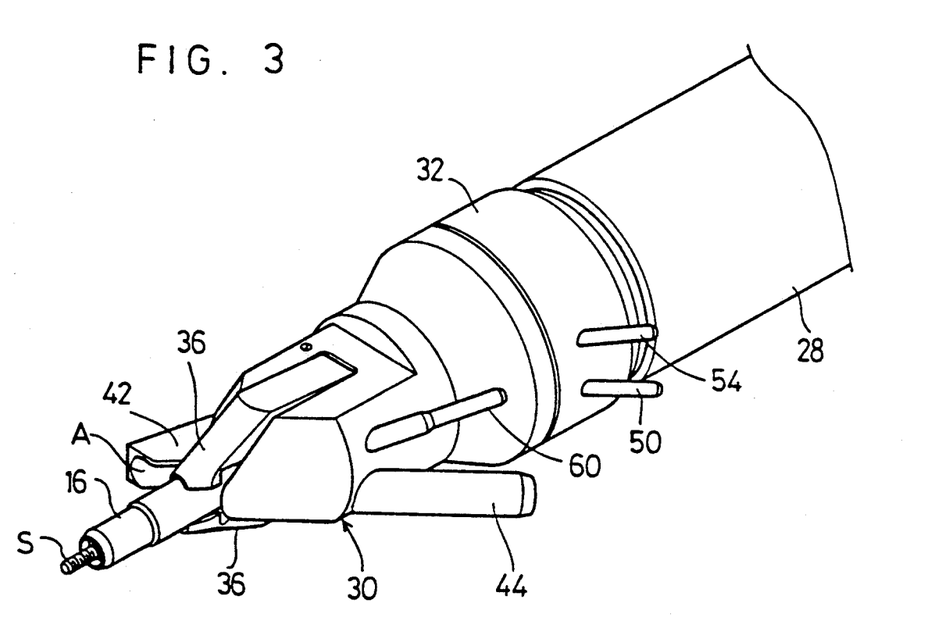
FIG. 3 is a perspective view of a screw supplying- and supporting-unit of the motor-driven screw driver illustrated in FIG. 2.

A screw supplying- and supporting-unit 30 for supplying and retaining a screw by a suction force is slidably located between the fixed inner shell 26 and the fixed outer shell 28 of the motor-driven screw driver body 10. The screw supplying- and supporting-unit 30 includes an outer shell 32 which is interposed between the fixed inner shell 26 and the fixed outer shell 28, and an inner shell 34 which is in contact with the peripheral edge of one end of the bearing housing 20 supported by the fixed inner shell 26. Further, at the distal end portion of the screw supplying- and supporting-unit 30, there is provided a pair of claws 36, 36 which are openable by spring force. The claws 36, 36 serve to temporarily retain the screw aligned in the axial direction of the shaft 12. Also, at the distal end portion of the unit 30, there is provided an oscillating claw 42 which is openable by spring force. The oscillating claw 42 is provided with a screw guide passage (A) as shown in FIG. 3, which serves to correctly place the screws which has passed through a screw guiding passage 38 and a suction guide passage 40, on the screwing position. The screw guiding passage 38 is connected to a screw supplying pipe 44 for receiving the screw from the outside of the driver body 10. In addition, a first fluid chamber 48 is formed between an outer shell 32 and an inner shell 34 and communicates with a first ventilating pipe 50 which is secured on the outer shell 32 such that air pressure is applied into the first fluid chamber 48. A second fluid chamber 52 is airtightly formed between the outer shell 32 and the fixed inner shell 26 of the driver body 10 and communicates with a ventilating passage 46 formed in the outer shell 32. The ventilating passage 46 communicates with a second ventilating pipe 54 which is secured on the outer shell 32 so that air pressure is applied into the second chamber 52. A third fluid chamber 56 is formed between the inner shell 34 and the suction guide 16 and communicates via a ventilating passage 58 with a third ventilating pipe 60 such that air pressure is applied into the third fluid chamber 56. In such a case, the third fluid chamber 56 communicates with an inside of the guide 16 through an aperture 62 which is formed on the bearing housing side of the suction guide 16 each other.

In the screw supplying- and supporting-unit 30 thus constituted, when air pressure is applied via the first ventilating pipe 50 into the first fluid chamber 48, a volume of the chamber 48 increases so that the screw supplying- and supporting unit 30 moves in the axial direction of the shaft 12 away from the fixed outer shell 28 of the driver body 10 (see FIG. 1). In this case, the distal end portion of the suction guide 16 is retreated relative to the screw supplying- and supporting-unit 30 and received therein. On the other hand, when air pressure is applied through the second ventilating pipe 54 into the second fluid chamber 52, a volume of the second fluid chamber 52 increases so that the screw supplying- and supporting-unit 30 is moves toward the fixed outer shell 28 in the axial direction of the shaft 12 and is received in the space defined by the fixed inner shell 26 and the fixed outer shell 28 (see FIG. 2). In such a case, the distal end portion of the suction guide 16 spreads a pair of the openable claws 36, 36 radially against the spring force and projects outwardly from the screw supplying- and supporting-unit 30. Further, when the third fluid chamber 56 is connected to a vacuum source through the third ventilating pipe 60, the chamber 56 decreases in pressure so that a vacuum suction force is always developed an inside of the suction guide 16.

Figure 6:
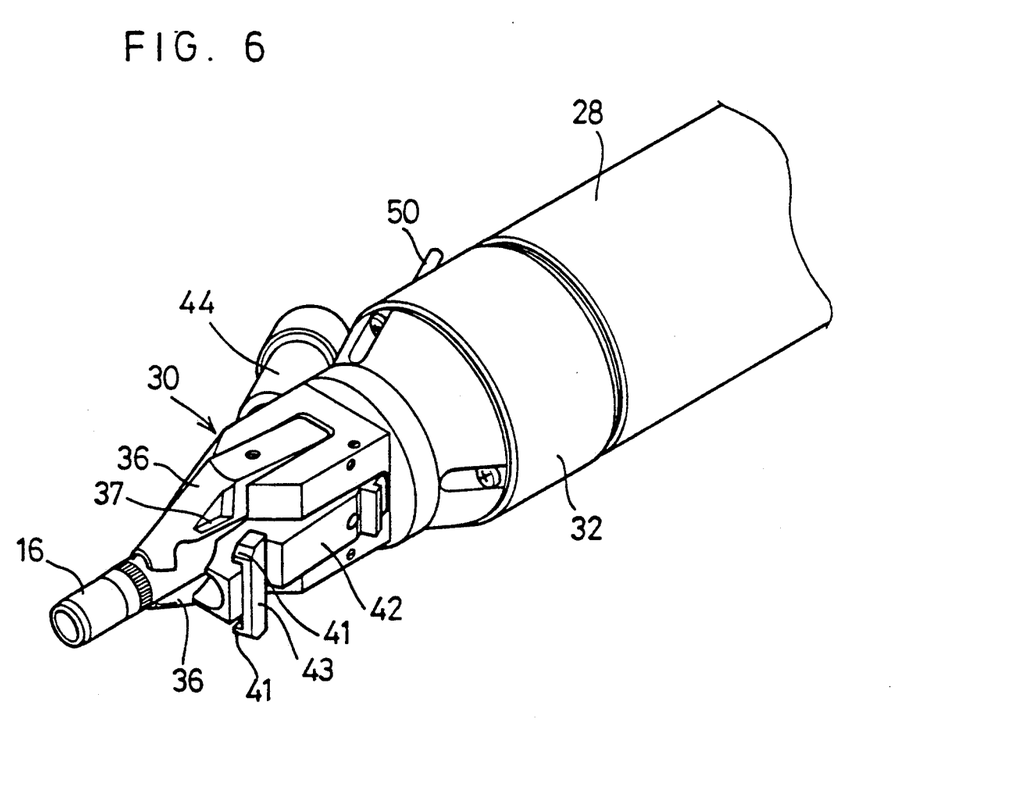
FIG. 6 is a perspective view of another embodiment of the screw supplying- and supporting-unit of the automatic screw driver according to the invention.

As described above, the screw supplying- and supporting-unit 30 is provided with a pair of claws 36, 36 and the oscillating claw 42 which are respectively openable oscillator by a given spring force. When the suction guide 16 projects outwardly as shown in FIG. 2, the oscillating claw 42 pivots around a pivotal pin (B) by pressing the suction guide 16 against an elastic force of the spring coil (C) so that the oscillating claw 42 is taken into an open state. If the spring force is excessively high, the resistance force against opening the oscillating claw is also high. In such a case, the oscillating claw is not sufficiently opened and prevents the distal end of the suction guide 16 from projecting outwardly. To this end, the tip end of the bit 14 is allowed to project from the distal end of the suction guide 16 so that the screw is not sucked and retained at the distal end of the suction guide 16. Therefore, it is preferable to predetermine the spring force to be comparatively low. However, in this case, if the screw is delivered at a high speed through the screw guiding passage 38 to the suction guide passage 40, the screw may spread the openable claws 36, 36 upon impingement of the screw against the claws 36, 36 and fall off from the screw supplying- and supporting-unit. In order to eliminate such problems, there is provided another embodiment of the screw supplying- and supporting-unit of the motor-driven screw driver according to the present invention. Referring to FIG. 6, each of openable claws 36, 36 has a recessed portion 37 on the same side. A locking member 43 is mounted on the end portion of an oscillating claw 42. Protrusions 41 which are respectively engaged with the recessed portions are formed at opposite ends of the locking member 43. The locking member 43 thus constituted prevents the claws 36, 36 from being opened only by the spring force upon delivering the screw into the suction guide passage. Accordingly, a supply and retention of the screw is stably conducted.

Figure 4:
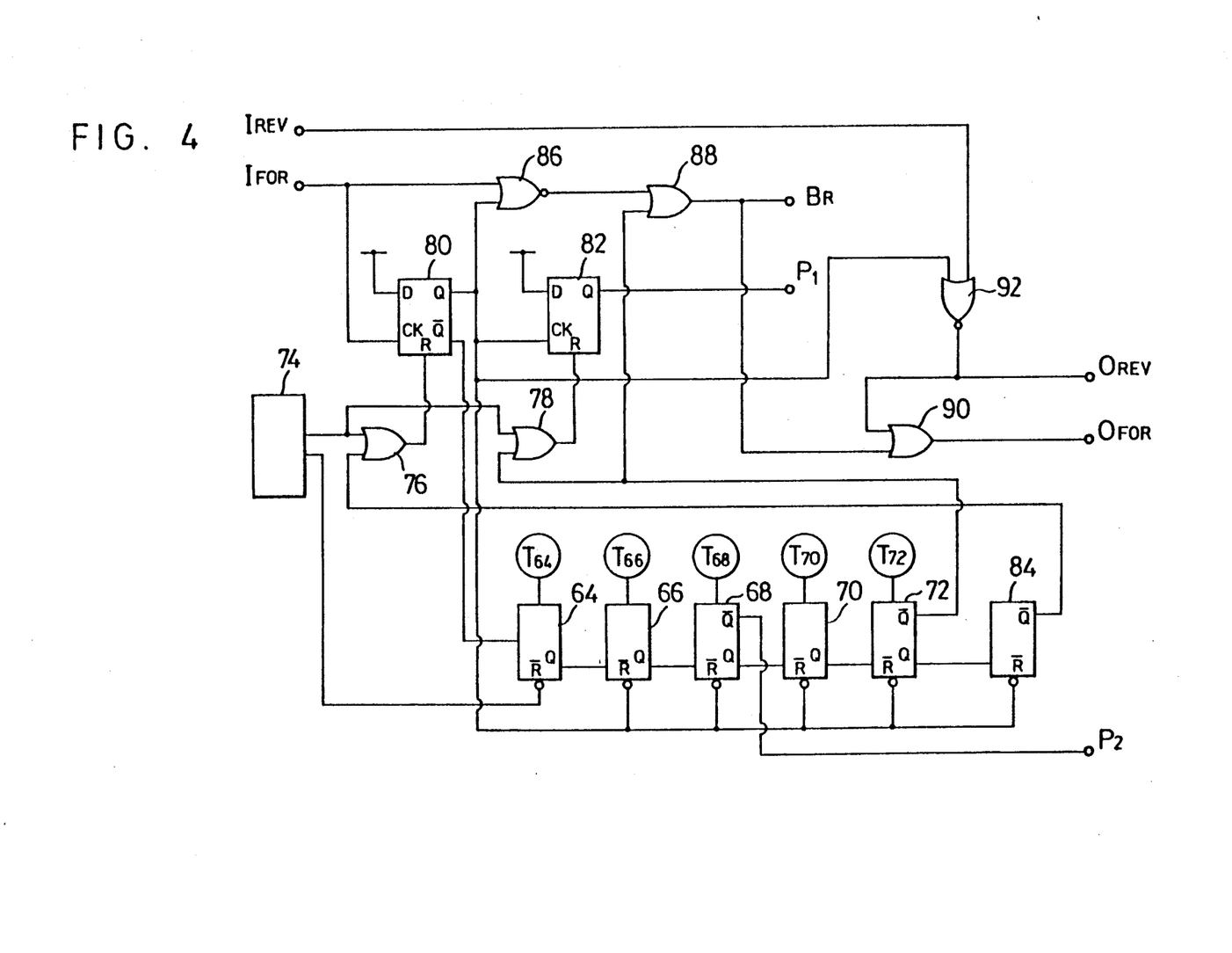
FIG. 4 is a block diagram showing one embodiment of a control circuit used for the automatic screw driver according to the invention.

A control circuit for the automatic screw driver constituted as mentioned above will be described in detail hereinafter. FIG. 4 is directed to one embodiment of the control circuit used for the aforementioned automatic screw driver. Referring to FIG. 4, reference numerals 64, 66, 68, 70 and 72 depict first, second, third, fourth and fifth flip-flops, respectively. These flip-flops 64–72 are respectively provided with timers of T64, T66, T68, T70 and T72. As described below, each of the timers serves to determine a control period required for performing an operation in each step of a sequential process consisting of generating a screw-supply-start command, delivering the screw to the screw supplying- and supporting-unit 30 (see FIGS. 1 to 3), supporting the screw at the distal end portion of the suction guide 16 and waiting for starting the screwing operation. In the control circuit shown in FIG. 4, the flip-flops 64–72 are sequentially operable by retaining the respective periods predetermined by the timers T64–T72 so that the motor-driven screw driver performs the operation in each step of the sequential process. Referring to FIG. 4, there are provided a power input control unit 74, controllers 76 and 78, flip-flops 80 and 82, a timer reset flip-flop 84, forward rotation drive controllers 86, 88 and 90 for the motor-driven screw driver and a reverse rotation drive controller 92 therefor. $I_{FOR}$, $I_{REV}$, $O_{FOR}$, $O_{REV}$, $P_1$, $P_2$, $B_R$ respectively represent an input terminal for a forward rotation drive command, an input terminal for a reverse rotation drive command, an output terminal for the forward rotation drive command, an output terminal for the reverse rotation drive command, an output terminal for an air pressure-in-first fluid chamber command, an output terminal for an air pressure-in-second fluid chamber command and an output terminal for a bit rotation command.

Figure 5:
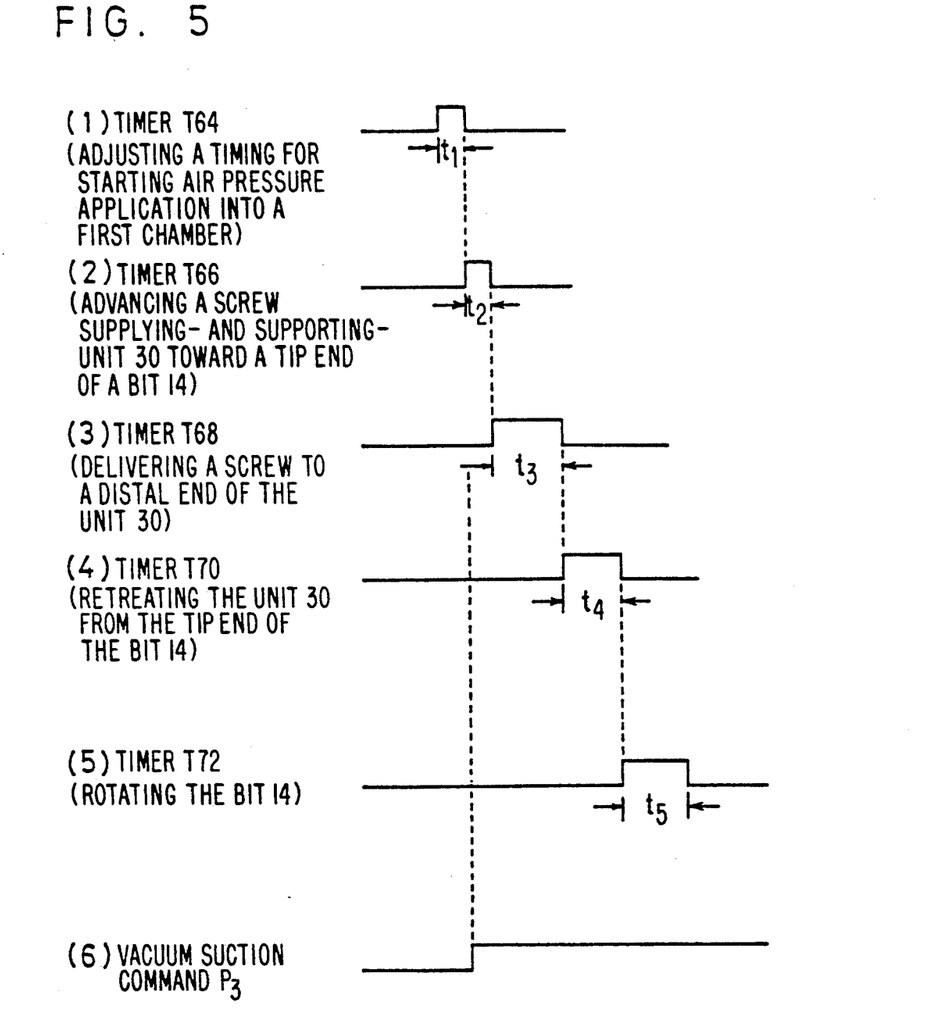

An operation of the above-mentioned control circuit will be described hereinafter with reference to an operational timing chart shown in FIG. 5.

(1) First, the power input control unit 74 is turned ON. A reset signal is transmitted to the first flip-flop 64 and the timer T64 is reset. Then, the controllers 76 and 78 are not operated. When $I_{FOR}$, the input terminal for the forward rotation drive command receives a required command signal, the flip-flop 80 is operated to transmit an operation signal to the first flip-flop 64 such that the timer T64 starts [see FIG. 5(1)]. At the same time, the flip-flop 80 generates reset signals to the second to fifth flip-flops 66–72 and the timer reset flip-flop 84. When the predetermined period of the first timer T64 is terminated, a given operation signal is generated from the flip-flop 82 to the output terminal $P_1$ for the air pressure-in-first fluid chamber command which serves for applying air pressure into the first fluid chamber 48 of the screw supplying- and supporting-unit 30. Therefore, in such a case, the first timer T64 predetermines the period $t_1$ required for adjusting a timing for starting air pressure application into the first fluid chamber 48.

(2) When the predetermined period of the first timer T64 is terminated, the first flip-flop 64 transmits to the second flip-flop 66 an operation signal for starting the timer T66 [see FIG. 5(2)]. While the second timer T66 is actuated, the air pressure is applied into the first fluid chamber 48 so that the screw supplying- and supporting-unit 30 is positioned as shown in FIG. 1 in relation to the motor-driven screw driver body 10. Therefore, the second timer T66 predetermines the period $t_2$ required for advancing the screw supplying- and supporting-unit 30 toward a tip end of the bit 14.

(3) When the predetermined period of the second timer T66 is terminated, the second flip-flop 66 transmits to the third flip-flop 68 an operation signal for starting the timer T68 [see FIG. 5(3)]. While the third timer T68 is actuated, the screw S is delivered by air pressure from a supply source (not shown in the drawings) through the screw supplying pipe 44 to the screw guiding passage 38 of the screw supplying- and supporting-unit 30 and held in place by the claws 36, 36 to be on standby. The third timer T68 predetermines the period $t_3$ required for transporting the screw S to the distal end of the unit 30 by air pressure.

(4) When the predetermined period of the third timer T68 is terminated, the third flip-flop 68 transmits to the fourth flip-flop 70 an operation signal for starting the timer T70 [see FIG. 5(4)]. At the same time, the third flip-flop 68 generates a given operation signal to the output terminal $P_2$ for the air pressure-in-second fluid chamber command which serves for applying air pressure into the second fluid chamber 52 of the screw supplying- and supporting-unit 30. While the fourth timer T70 is actuated, air pressure is applied into the second fluid chamber 52 so that the screw supplying- and supporting-unit 30 is positioned as shown in FIG. 2 in relation to the motor-driven screw driver body 10. Therefore, the fourth timer T70 predetermines the period $t_4$ required for moving the screw supplying- and supporting-unit 30 away from the tip end of the bit 14.

(5) Further, when the predetermined period of the fourth timer T70 is terminated, the fourth flip-flop 70 transmits to the fifth flip-flop 72 an operation signal for starting the timer T72 [see FIG. 5(5)]. While the fifth timer T72 is actuated, the controllers 78, 88 receive given operation signals. To this end, the controller 78 permits the flip-flop 82 to be reset and the controller 88 transmits an input signal for rotating the bit 14 from $B_R$ (i.e., the output terminal for the bit rotating command) to the motor-driven screw driver body 10. Therefore, the fifth timer T72 predetermines the period $t_5$ required for keeping the bit 14 rotated.

According to the invention, a vacuum suction force is continuously developed in the third fluid chamber 56 by a vacuum suction command $P_3$ generated in no relation to the aforementioned sequential control operations [see FIG. 5(6)]. To this end, the screw S is positioned and retained stably at the tip end portion of the bit 14 by the vacuum suction force generated at the distal end of the suction guide 16 communicated with the third fluid chamber 56. Then, a groove portion formed on the head of the screw S is engaged instantaneously with the tip end portion of the bit 14 so that the screw S is in a standby state suitable for a screwing operation. The fifth timer T72 is used for setting the period required for the engagement of the screw S with the bit 14. In such a state, the controller 90 starts generation of an input signal for rotating the bit 14 to fasten the screw S from $O_{FOR}$ (i.e., the output terminal for the forward rotation drive command) to the motor-driven screw driver body 10, so that the driver body 10 is on standby for the screwing operation of the bit 14.

Thus, when the predetermined period of the fifth timer T72 is terminated, the fifth flip-flop 72 transmits an operation signal to the timer reset flip-flop 84. The timer reset flip-flop 84 transmits to the controller 76 a reset signal for resetting the flip-flop 80. When the flip-flop 80 is reset, generates reset it signals to the second to fifth flip-flops 66–72 and the reset flip-flop 84. To this end, all of the second to fifth flip-flops 66–72 and the reset flip-flop 84 are reset and are on standby for the subsequent screwing operation.

In case the screw is to be unfastened, if necessary, the motor-driven screw driver is driven to rotate in such a reverse direction that the screw will loosen. In this case, when an input signal is transmitted an input signal for reversely rotating the motor-driven screw driver, to the $I_{REV}$ (i.e., the input terminal for the reverse rotation drive command) is generated through the controller 92 from $O_{REV}$ (i.e., the output terminal for the reverse rotation drive command). The motor-driven screw driver according to the invention is provided with such a control circuit that the aforementioned sequential operation of the screw automatic supply and control is not influenced even though the reverse rotating operation of the motor-driven screw driver is performed during the sequential operation. Namely, when an input signal is transmitted from the $I_{FOR}$ (i.e., the input terminal for the forward rotation drive command) to the flip-flop 80, the output signal from the flip-flop 80 is transmitted to the controller 92. To this end, the controller 92 is kept interlocked to stop the reverse rotation drive until the sequential operation of the screw automatic supply and control is completed. On the other hand, the output signal from the flip-flop 80 is transmitted to the controller 86 so that the controller 86 is kept interlocked to reject another input signal for generating the forward rotation drive command until the sequential operation is completed.

As is obvious from the aforementioned preferred embodiment, the method for controlling the motor-driven screw driver according to the invention includes a plurality of timers for respectively predetermining the period required for entering the standby state for starting the advancing movement of the screw supplying- and supporting-unit toward the tip end of the bit after generating the operation signal, the period required for advancing the unit toward the tip end of the bit, the period required for supplying the screw to the unit, the period required for retreating the unit from the tip end of the bit, and the period required for rotating the bit. The timers are started sequentially one after another so that the sequential operation including all steps between a supply of the screw and fastening thereof by the rotating bit is achieved in good time and stably.

In the automatic screw driver according to the invention, the fluid chamber which is communicated with the inside of the suction guide in order to develop the vacuum suction force therein, is formed between the outer surface of the suction guide and the inner surface of the inner shell of the screw supplying- and supporting-unit. Therefore, a screw can be sucked irrespective of kind of material therefor and retained in the suction guide by the vacuum suction force.

Particularly, in the automatic screw driver according to the invention, when the screw head is sucked and held at the tip end of the bit disposed in the suction guide, the tip end portion of the bit is completely engaged with the groove portion formed on the screw head by rotating the bit for the predetermined period. Therefore, there is eliminated such disadvantage as the screw being positioned slantly relative to the screwing direction upon the screwing operation. In addition, the suction guide retaining the screw is supported elastically in the axial direction of the bit. Therefore, the suction guide retreats suitably when abutting against the object on which the screw is fastened, so that the screwing operation is performed without any trouble caused by the suction guide.

The control circuit which is essential to the method for controlling the automatic screw driver according to the invention has a simple configuration to be readily formed. Further, the method for controlling the driver is easily applicable, and at low cost to a motor-driven screw driver with a conventional screw supplying mechanism. Consequently, the automatic screw driver and the method for controlling the same according to the invention achieves a considerable improvement in characteristics of the automatic screw driver.

Thus, the invention has been described hereinbefore with its preferred embodiments. It will be appreciated that many variations and modifications may be made without departing from the spirit and scope of the invention.

What is claimed is:

1. An automatic screw driver comprising:
a bit detachably mounted on a distal end of a rotating output shaft extending from a motor-driven screw driver body;
a suction guide mounted on an end portion of the rotating output shaft so as to be movable in the axial direction of the output shaft, said suction guide surrounding said bit and projecting from a tip end of said bit by a sufficient length to receive a screw head;
a screw supplying and supporting unit having an inner and outer shell, said unit being movably mounted on the driver body and surrounding said suction guide, said unit including means for delivering a screw to a distal end of said unit and means for temporarily retaining said screw there, while moving said unit toward and away from end portions of said bit and said suction guide in the axial direction of the output shaft;
first and second fluid chambers positioned between said unit and the driver body, whereby the screw is delivered to a distal end of said unit and retained there due to a suction force developed by alternatively supplying fluid to said first and second fluid chambers;
a third fluid chamber located between said suction guide and the inner shell of said unit and communicating with an inner space of said suction guide, whereby a vacuum suction force is developed therein, resulting in sucking and retaining the screw at distal end of said end preparatory to starting a screwing operation of the driver;
said screw supplying and supporting unit further comprising a pair of openable claws mounted opposite to each other on the distal end of said unit for temporarily retaining the screw there; an oscillating claw mounted on the distal end of said unit and including a suction guide passage for guiding and for correctly placing the screw which has passed through said suction guide passage at the distal end portion of said unit; a supply pipe for delivering from outside the driver body a screw into a screw guiding passage; a first ventilating pipe communicating with said first fluid chamber; a second ventilating pipe communicating with said second fluid chamber; and a third ventilating pipe communicating with said third fluid chamber.

2. The automatic screw driver according to claim 1, further including a control circuit comprising a plurality of timers for performing at predetermined timing intervals a sequential operation consisting of steps of advancing said screw supplying and supporting unit toward the tip end of said bit in the axial direction of the output shaft such that the tip end of the bit is retreated within said unit, supplying the screw to said unit, retreating said unit from the tip end of said bit in the axial direction of the output shaft, rotating said bit, and sucking and retaining the screw at the distal end of said unit preparatory to starting the screwing operation of the driver.

3. The automatic screw driver according to claim 1, wherein when the screw is supplied into said unit, said oscillating claw shuts the suction guide passage by pivoting around a pin, and said oscillating claw moves outwardly against a spring force so as to open the suction guide passage due to a pressure exerted on said oscillating claw by a retreating movement of said unit from the tip end of said bit.

4. The automatic screw driver according to claim 3, further including a locking member mounted on said oscillating claw and adapted to engage with said openable claws to prevent them from opening by the retreating movement of said unit.

* * * * *